United States Patent
Huang et al.

(10) Patent No.: US 10,191,202 B2
(45) Date of Patent: Jan. 29, 2019

(54) TOUCH PANEL ASSEMBLY HAVING LIGHT GUIDE PORTION AND PORTABLE ELECTRONIC DEVICE HAVING THE SAME

(71) Applicant: HTC Corporation, Taoyuan (TW)

(72) Inventors: Po-Chin Huang, Taoyuan (TW); Shih-Po Chien, Taoyuan (TW); Yu-Jing Liao, Taoyuan (TW); I-Cheng Chuang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 65 days.

(21) Appl. No.: 15/068,648

(22) Filed: Mar. 14, 2016

(65) Prior Publication Data

US 2017/0262117 A1  Sep. 14, 2017

(51) Int. Cl.
| | | |
|---|---|---|
| *G02F 1/1333* | (2006.01) | |
| *F21V 8/00* | (2006.01) | |
| *G06F 3/044* | (2006.01) | |
| *G06F 1/16* | (2006.01) | |

(52) U.S. Cl.
CPC ......... *G02B 6/0053* (2013.01); *G02B 6/0031* (2013.01); *G06F 1/1643* (2013.01); *G06F 3/044* (2013.01); *G06F 2203/04103* (2013.01)

(58) Field of Classification Search
CPC .... G02F 1/1333; G02F 1/1626; G02F 1/1637; G02F 1/169; G02F 3/041; G02F 3/04886; G09F 9/30; G06F 2203/0339
See application file for complete search history.

(56) References Cited

U.S. PATENT DOCUMENTS

| | | | |
|---|---|---|---|
| 7,650,056 B2 * | 1/2010 | Chen | B29D 11/00663 362/361 |
| 2011/0148777 A1 * | 6/2011 | Meng | G06F 3/041 345/173 |
| 2014/0253501 A1 | 9/2014 | Noguchi et al. | |
| 2014/0285730 A1 * | 9/2014 | Liu | G06F 1/169 349/12 |

FOREIGN PATENT DOCUMENTS

| | | |
|---|---|---|
| TW | I450002 | 8/2014 |
| TW | I470312 | 1/2015 |
| TW | I517001 | 1/2016 |

OTHER PUBLICATIONS

"Office Action of Taiwan Counterpart Application", dated Oct. 11, 2016, p. 1-p. 3, in which the listed references were cited.

* cited by examiner

*Primary Examiner* — Ram A Mistry
(74) *Attorney, Agent, or Firm* — JCIPRNET

(57) ABSTRACT

A touch panel assembly includes a touch panel, a flexible circuit board, an input element and a light emitting element. The touch panel includes sensing series and pads. The pads are disposed on bonding regions of the touch panel and electrically connected to the sensing series. The flexible circuit board includes bonding portions and a light guide portion. Each bonding portion is disposed at the bonding region and includes terminals electrically connecting the pads. The light guide portion includes a connecting portion connecting the corresponding bonding portion and an extending portion connecting the connecting portion and extended away from the touch panel. The input element is located right above the extending portion. The light emitting element is disposed at a light incident side of the light guide portion.

19 Claims, 9 Drawing Sheets

TOUCH PANEL ASSEMBLY HAVING LIGHT GUIDE PORTION AND PORTABLE ELECTRONIC DEVICE HAVING THE SAME

BACKGROUND OF THE INVENTION

Field of the Invention

The application relates to a touch panel assembly and a portable electronic device, and more specifically relates to a capacitive touch panel assembly and a portable electronic device using the capacitive touch panel assembly.

Description of Related Art

Recently, along with the rapid development and application of information technology, wireless mobile communication, and information appliances, various information products have changed from using conventional input devices, such as key boards or mice, to using touch panels as the input device in order to improve convenience and to achieve the targets of lighter weight and better humanization.

In current industry, shortcut keys or hot keys are usually disposed at the peripheral regions of the touch panel. Accordingly, the user presses the hot keys to quickly open a corresponding and commonly used function, so as to shorten the time needed to search and open such function and to improve the convenience in use. Moreover, in order to make the keys have light-emitting characteristic, a backlight module is usually disposed under the keys, wherein the backlight module has a light guide plate, and a light source is disposed at a side of the light guide plate, such that the light beam emitted by the light source is transmitted to the entire light guide plate so as to make the keys emit light. However, a layer of backlight module is needed in this configuration so that the thickness is correspondingly increased, and the cost of the light guide plate is high so that the reducing the production cost is difficult.

SUMMARY OF THE INVENTION

The application provides a touch panel assembly and a portable electronic device using the touch panel assembly, and the overall thickness of the touch panel assembly is thinner and the production cost of the touch panel assembly is lower.

The touch panel assembly of the application includes a touch panel, a flexible circuit board, at least one input element, and at least one light emitting element. The touch panel includes a plurality of sensing series and a plurality of pads. The pads are disposed on a plurality of bonding regions of the touch panel, and electrically connected to the corresponding sensing series respectively, wherein the bonding regions are located at a side of the touch panel. The flexible circuit board includes a plurality of bonding portions and at least one light guide portion. The bonding portions are extended and connected to the bonding regions respectively. Each of the bonding portions includes a plurality of terminals and is electrically connected to the corresponding pad. The light guide portion includes a connecting portion and an extending portion. The connecting portion is connected to the corresponding bonding portion and the extending portion is connected to the connecting portion and extended in a direction away from the touch panel. The input element is located right above the extending portion. The light emitting element is disposed at a light incident side of the light guide portion and configured to emit a light beam, such that the light beam enters the light guide portion and illuminates the input element.

The portable electronic device of the application includes a case, a display module, a touch panel, a flexible circuit board, at least one input element, and at least one light emitting element. The case has an opening. A host module is disposed inside the case. The display module is disposed in the case, wherein the opening exposes a display surface of the display module. The touch panel is disposed on the display surface. The touch panel includes a plurality of sensing series and a plurality of pads. The pads are disposed on a plurality of bonding regions of the touch panel, and electrically connected to the corresponding sensing series respectively, wherein the bonding regions are located at a side of the touch panel. The flexible circuit board includes a plurality of bonding portions and at least one light guide portion. The bonding portions are extended and connected to the bonding regions respectively. Each of the bonding portions includes a plurality of terminals and is electrically connected to the corresponding pad. The light guide portion includes a connecting portion and an extending portion. The connecting portion is connected to the corresponding bonding portion and the extending portion is connected to the connecting portion and extended in a direction away from the touch panel. The input element is located right above the extending portion. The light emitting element is disposed at a light incident side of the light guide portion and configured to emit a light beam, wherein the light beam enters the light guide portion and illuminates the input element.

Based on the above, in the touch panel assembly and the portable electronic device using the touch panel assembly of the application, the flexible circuit board includes a plurality of the bonding portions and at least one light guide portion, the bonding portions are configured to connect to a plurality of the pads of the touch panel, and the light guide portion is located between any adjacent two of the bonding portions. In addition, the light guide portion has an extending portion extended in a direction away from the touch panel, the input element is disposed right above the light guide portion, and the light emitting element is disposed at a light incident side of the light guide portion, such that the light beam enters the extending portion and illuminates the input element located above the extending portion. With this disposition, the touch panel assembly and the portable electronic device using the touch panel assembly of the application may provide the input element with a uniform backlight without disposing a light guide plate, so as to efficiently reduce the overall thickness and to further reduce the production cost.

In order to make the aforementioned and other features and advantages of the application more comprehensible, embodiments accompanying figures are described in detail belows.

DESCRIPTION OF THE EMBODIMENTS

Figure 1:
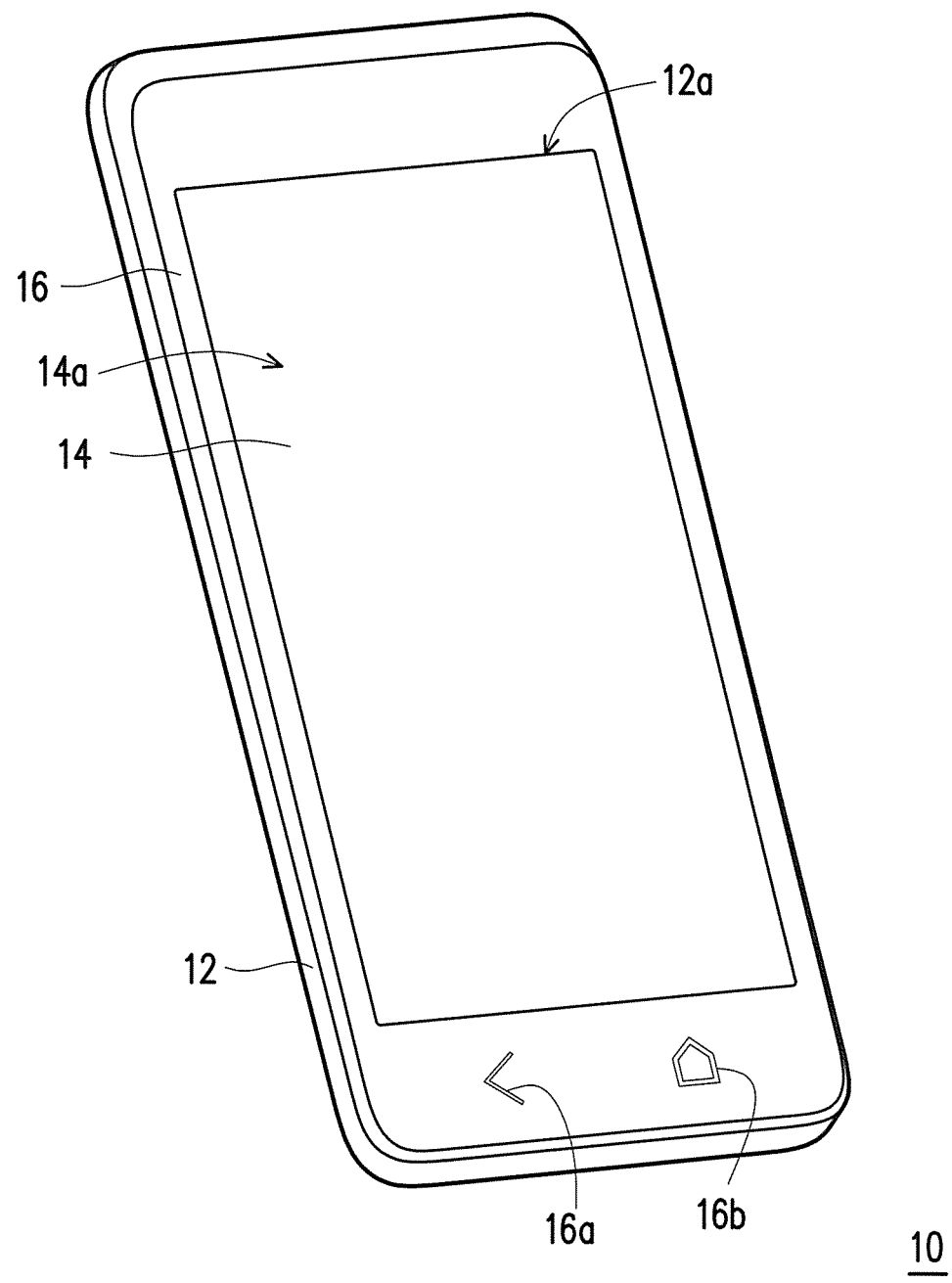
FIG. 1 is a three dimensional view of a portable electronic device according to one embodiment of the invention.
Figure 2:
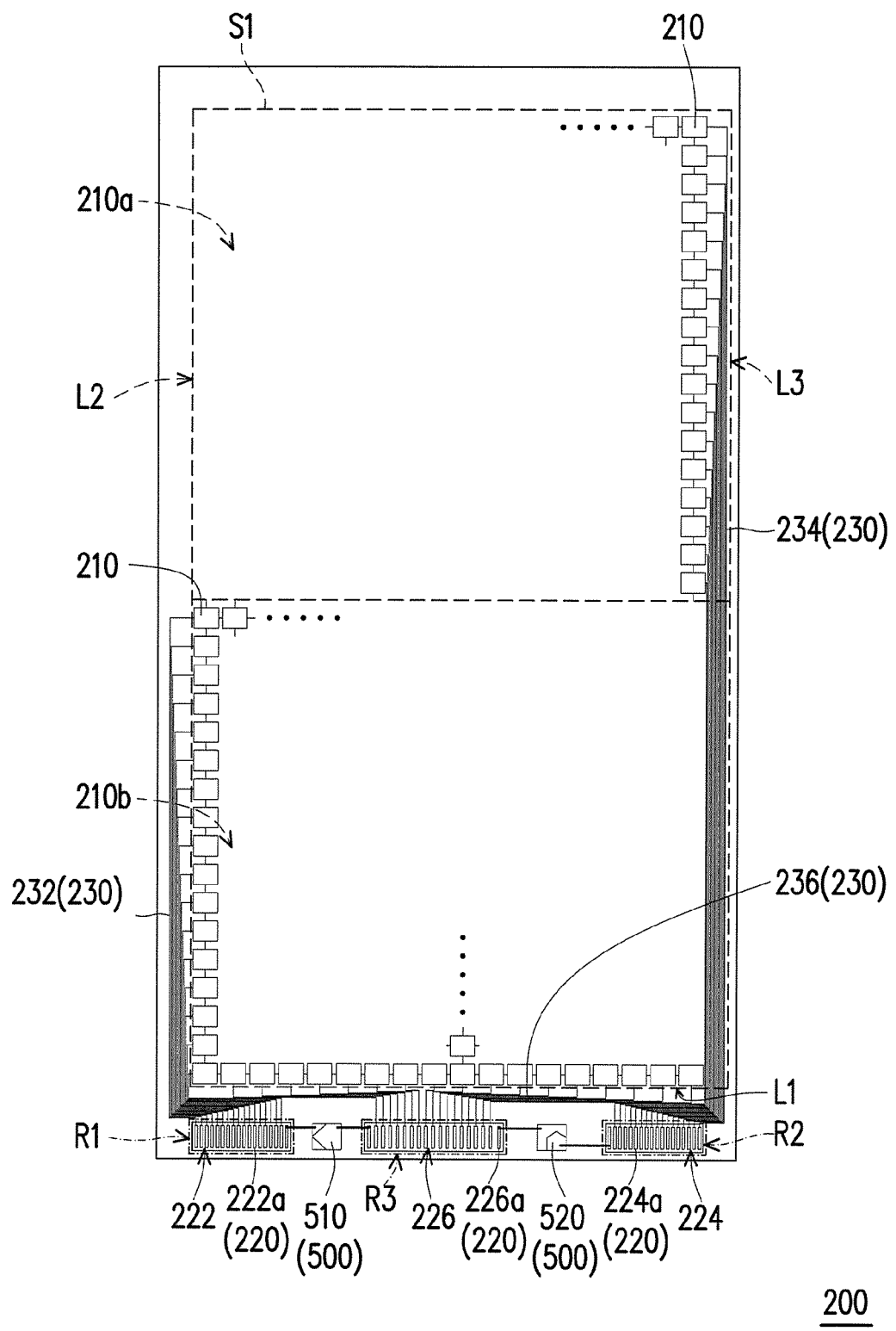
FIG. 2 is a schematic view of a touch panel according to one embodiment of the invention.
Figure 3:
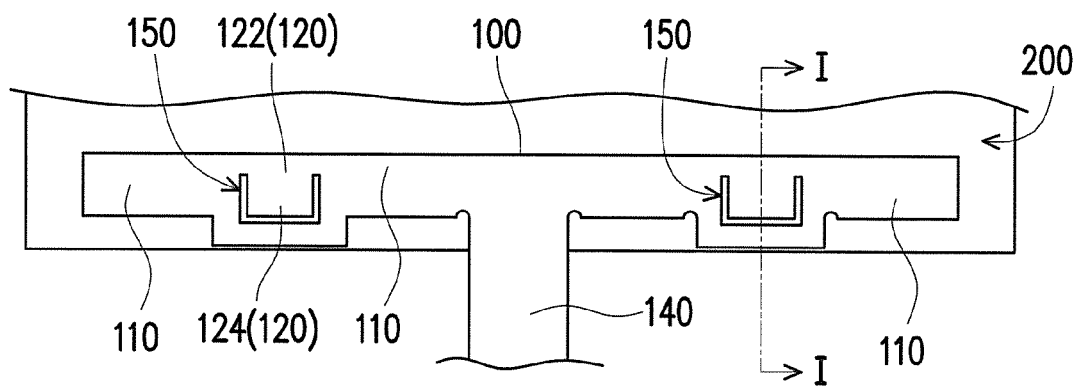
FIG. 3 is a partial schematic bottom view of a touch panel assembly according to one embodiment of the invention.

FIG. 1 is a three dimensional view of a portable electronic device according to one embodiment of the invention. FIG. 2 is a schematic view of a touch panel according to one embodiment of the invention. FIG. 3 is a partial schematic bottom view of a touch panel assembly according to one embodiment of the invention. Referring to FIG. 1 to FIG. 3, a portable electronic device 10 of the present embodiment may be a smartphone as shown in FIG. 1. However, the present embodiment is merely illustrated as an example. In other embodiments, the portable electronic device 10 of the application may also be a portable electronic device having touch control function, such as a tablet PC or an eBook, etc. As shown in FIG. 1 to FIG. 3, the portable electronic device 10 of the present embodiment includes a case 12, a display module 14, a transparent cover 16, a flexible circuit board 100, and a touch panel 200. The case 12 has an opening 12a as shown in FIG. 1. The display module 14 is disposed in the case 12, wherein the opening 12a exposes a display surface 14a of the display module 14. The touch panel 200 as shown in FIG. 2 may be disposed on the display surface 14a, and the flexible circuit board 100 is adapted to be bent and electrically connected to the touch panel 200 and a host module of the portable electronic device 10. The transparent cover 16 is disposed on the touch panel 200 and covers the opening 12a of the case 12. The transparent cover 16 has at least one transparent pattern 16a, and the transparent pattern may serve as a key pattern of the portable electronic device 10.

The touch panel assembly 50 of the present embodiment includes a flexible circuit board 100, a touch panel 200, an input element 500, and at least one light emitting element 300. The touch panel 200 includes a plurality of sensing series 210, a plurality of pads 220, and a plurality of connecting wires 230. The sensing series 210 are disposed in a sensing region S1 of the touch panel 200. The pads 220 are disposed outside the sensing region S1, and the connecting wires 230 are electrically connect to the corresponding sensing series 210 respectively. With this disposition, when a user touches the touch panel 200 with a finger, a capacitance change between the sensing series is occurred at the position touched by the finger on the touch panel 200, the capacitance change is converted to a control signal and transmitted to an external circuit to output an appropriate command by an calculation process, so as to operate the portable electronic device 10 accordingly.

In detail, referring to FIG. 2, the pads 220 may include a first pad group 222, a second pad group 224, and a third pad group 226, wherein the first pad group 222 includes a plurality of first pads 222a, the second pad group 224 includes a plurality of second pads 224a, and the third pad group 226 includes a plurality of third pads 226a. The first pad group 222, the second pad group 224 and the third pad group 226 are respectively disposed at a plurality of bonding regions R1, R2, and R3 of the touch panel 200. The bonding regions R1, R2, and R3 are located at a side L1 of the sensing region S1.

Accordingly, the connecting wires 230 may include a plurality of first connecting wires 232, a plurality of second connecting wires 234, and a plurality of third connecting wires 236, wherein the first connecting wires 232 are disposed at a side L2 of the touch panel 200 and electrically connect the sensing series 210 located in a lower section 210b of the touch panel 200 to the corresponding first pads 222a. The second connecting wires 234 are disposed at a side L3 of the touch panel 200 and electrically connect the sensing series 210 located in an upper section 210a of the touch panel 200 to the corresponding second pads 224a. Therefore, the sensing series 210 of the present embodiment are divided into two sections 210a and 210b and connected to the corresponding pads 222a and 224a via the connecting wires 232 and 234 respectively, so as to save the layout space of the connecting wires 232 and 234 on the touch panel 200. Thereby, the size of the touch panel 200 is reduced, and the peripheral frame of the portable electronic device 10 is also reduced, so as to increase the display area of the portable electronic device 10. Similarly, the third connecting wires 236 are disposed at the side L1 of the touch panel 200 and electrically connect the sensing series 210 located at the side L1 to the corresponding third pads 226a.

In the present embodiment, the input elements 500 may be, for example, disposed at the side L1 of the sensing region S1 and located between any adjacent two of the bonding regions R1, R2, and R3. Moreover, the input elements 500 and the bonding regions R1, R2, and R3 are disposed alternately with each other along a direction parallel to the side L1. The input elements 500 may be, for example, a physical key, light sensitive key, strength sensitive key, etc., disposed on the portable electronic device 10. The types of the input elements 500 and the methods for the input elements 500 to generate control signals are not limited in the application. In the present embodiment, the input element 500 may be a physical key. The input element 500 is different from the virtual key displayed by the display module. To be more specific, the input elements 500 may include a first input element 510 and a second input element 520. The first input element 510 and the second input element 520 are respectively located right below the first transparent pattern 16a and the second transparent pattern 16b as shown in FIG. 1, and the first input element 510 and the second input element 520 may respectively have different functions such as returning to the previous page or returning to the home page, etc. It should be noted here, the number of the input element 500 of the present embodiment is plural, but the present embodiment is merely illustrated as an example, the number of the input element 500 is not limited in the application.

Figure 4:
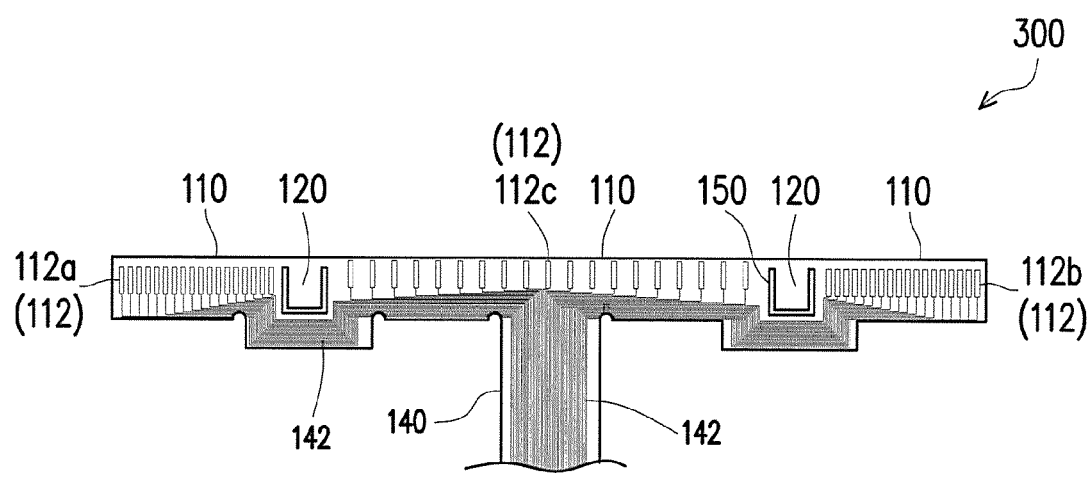
FIG. 4 is a schematic bottom view of the flexible circuit board in FIG. 3.
Figure 5:
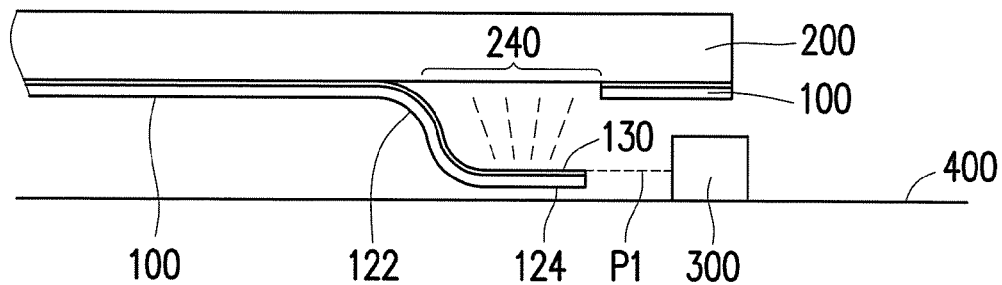
FIG. 5 is a partial schematic cross-section view of the touch panel assembly in FIG. 3 along a line I-I.

FIG. 4 is a schematic bottom view of the flexible circuit board in FIG. 3. FIG. 5 is a partial schematic cross-section view of the touch panel assembly in FIG. 3 along a line I-I. Referring to FIG. 3 to FIG. 5, in the present embodiment, the flexible circuit board 100 includes a plurality of bonding portions 110 and at least one light guide portion 120 as shown in FIG. 3 and FIG. 4. The bonding portions 110 are extended and connected to the bonding regions R1, R2, and R3 as shown in FIG. 2 respectively. Each of the bonding portions 110 as shown in FIG. 4 includes a plurality of terminals 112 and is electrically connected to the corresponding pad 220. In detail, each of the bonding portions 110 includes a plurality of first terminals 112a, a plurality of second terminals 112b, and a plurality of third terminals 112c. The first terminals 112a are electrically connected to the first pads 222a of the first pad group 222 respectively, the second terminals 112b are electrically connected to the second pads 224a of the second pad group 224 respectively, and the third terminals 112c are electrically connected to the third pads 226a of the third pad group 226 respectively. In the present embodiment, the flexible circuit board 100 is disposed at a lower surface of the touch panel 200, and the bonding regions R1, R2, and R3 of the touch panel 200 are correspondingly disposed at the lower surface of the touch panel 200, such that the pads 220 in the bonding regions R1, R2, and R3 are electrically connected to the terminals 112 of the bonding portions 110 respectively. Under this disposition, the elements disposed at the lower surface of the touch panel 200 are illustrated in a perspective manner in FIG. 2.

Moreover, the flexible circuit board 100 may further include a hub portion 140 and a plurality of traces 142, the hub portion 140 is connected to the bonding portions 110 and may be extended to outside of the touch panel 200, the traces 142 are respectively connected to the first terminals 112a, the second terminals 112b, and the third terminals 112c and collected to the hub portion 140 so as to be electrically connected to, for example, a host module of the portable electronic device 10 via the hub portion 140.

In the present embodiment, the light guide portion 120 includes a connecting portion 122 and an extending portion 124 connected to each other as shown in FIG. 3. The connecting portion 122 is connected to the corresponding bonding portion 110, and the extending portion 124 faces the light emitting element 300 and is extended in a direction away from the touch panel 200 as shown in FIG. 5. Moreover, the input element 500 is located right above the extending portion 124. In the present embodiment, the number of the light guide portions 120 is corresponding to the number of the input elements 500 and may both be plural (illustrated as two, but the application is not limited thereto), the light guide portions 120 respectively overlap with the orthogonal projection areas of the input elements 500 where the input elements orthogonally projected. To be more specific, the light guide portions 120 are respectively located right below the input elements 500. In the present embodiment, the flexible circuit board 100 further includes at least one slot 150 (illustrated as two, but the application is not limited thereto), the slots 150 respectively surround the extending portions 124 on the flexible circuit board 100 to define the corresponding light guide portions 120 as shown in FIG. 3.

In the present embodiment, the flexible circuit board 100 further includes a light guide film 130 covering at least one upper surface of the light guide portion 120. For example, the light guide film 130 may replace the uppermost dielectric layer of the flexible circuit board 100 and completely cover a top surface of the flexible circuit board 100. However, the above descriptions are merely for illustration, which should not be construed as a limitation to the application. In other embodiments, the light guide film 130 may only cover the upper surface of the light guide portion 120. The light emitting element 300 is disposed at a light incident side of the light guide portion 120. Specifically, the light emitting element 300 may be disposed on a substrate 400 as shown in FIG. 5, and the light emitting element 300 is located between the touch panel 200 and the substrate 400. The light emitting element 300 is configured to emit a light beam (depicted as a dotted line in FIG. 5). The extending portion 124 is located on a light transmitting path P1 of the light beam, such that the light beam enters the light guide film 130 on the extending portion 124 to illuminate the input element 500 above the extending portion 124. In the present embodiment, the number of the light emitting elements 300 is corresponding to the number of the light guide portions 120 and may both be plural, and the extending portions 124 of the light guide portions 120 are respectively located on the light transmitting paths P1 of the light beams emitted by the light emitting elements 300.

The light guide film 130 in the present embodiment may be a transparent film with high refractive index and light transmittance, and the surface of the light guide film 130 may include a plurality of micro structures in, for example, a dot mesh pattern. As such, the light guide film 130 utilizes total reflection phenomenon of the light beam due to the difference between the refractive indexes of the mediums, such that the light beam is guided to be emitted from the surface facing the input element 500 via the micro structures in dot mesh pattern, so as to illuminate the input element 500. With this disposition, uniform backlight can be provided to the input element 500 without a need of additionally disposing a light guide plate.

Figure 6:
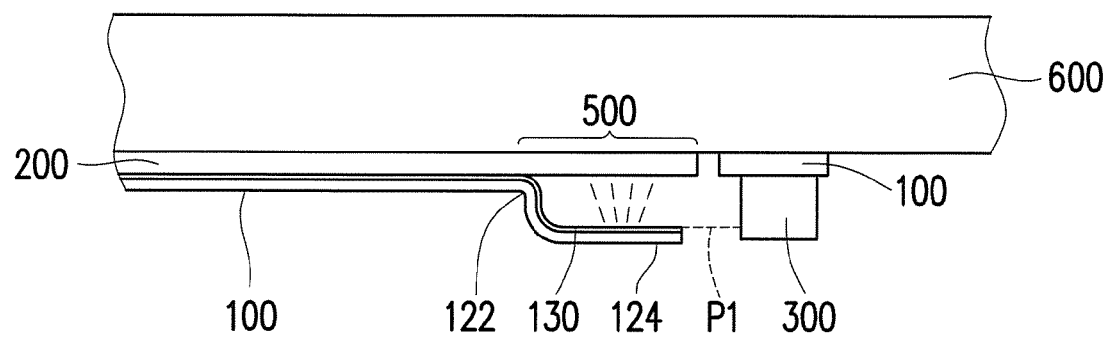
FIG. 6 is a partial schematic cross-section view of a touch panel assembly according to another embodiment of the invention.

FIG. 6 is a partial schematic cross-section view of a touch panel assembly according to another embodiment of the application. It should be noted that the touch panel assembly in the present embodiment is similar to the touch panel assembly in FIG. 5. Therefore, the present embodiment utilizes the same reference numbers and partial contents of the above embodiment, wherein the same reference numbers are adopted to represent same or similar elements and the description of similar technical content is omitted. Regarding the details of the omitted parts reference to the previous embodiment can be made, and will not be repeated in the present embodiment. Referring to FIG. 6, the differences between the touch panel assembly in the present embodiment and the touch panel assembly in FIG. 5 are described as follows.

In the present embodiment, the touch panel assembly further includes a transparent cover 600 covering the flexible circuit board 100 and the touch panel 200, wherein the light emitting element 300 is disposed at a lower surface of the transparent cover 600. The extending portion 124 faces the light emitting element 300 and is located on the light transmitting path P1 of the light beam emitted from the light emitting element 300. As a result, the light beam emitted from the light emitting element 300 may enter the light guide film 130 on the extending portion 124 and illuminates the input element 500.

Figure 7:
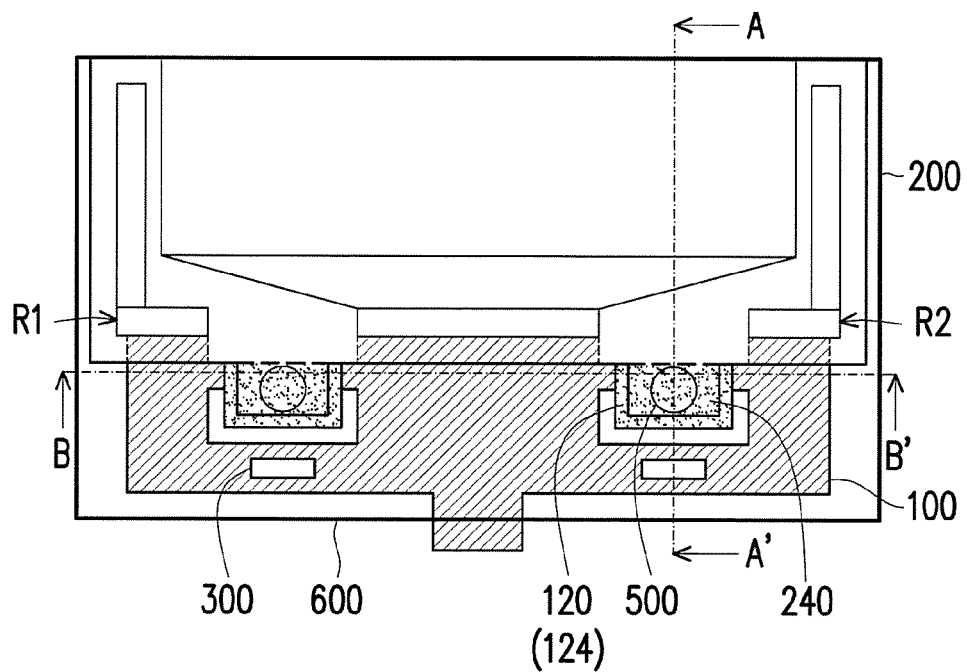
FIG. 7 is a schematic top view of a touch panel assembly according to one embodiment of the invention.

FIG. 7 is a schematic top view of a touch panel assembly according to one embodiment of the application. It should be noted that the touch panel assembly in the present embodiment is similar to the touch panel assembly in FIG. 6, hence, the present embodiment utilizes the same reference numbers and partial contents of the above embodiment, wherein the same reference numbers are adopted to represent same or similar elements and the description of similar technical content is omitted. Regarding the details of the omitted parts reference to the previous embodiment can be made, and will not be repeated in the present embodiment. The differences between the touch panel assembly in the present embodiment and the touch panel assembly in FIG. 6 are described as followings.

Figure 8:
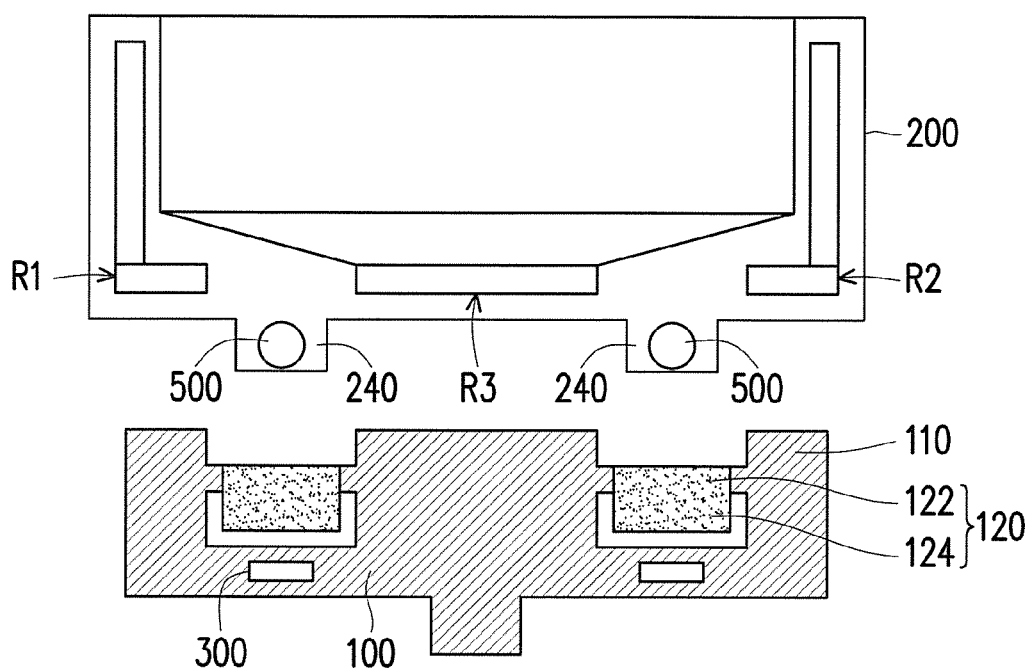
FIG. 8 is an exploded schematic view of some components of the touch panel assembly in FIG. 7.

FIG. 8 is an exploded schematic view of some components of the touch panel assembly in FIG. 7. It should be noted here, for the clarity and simplicity of the drawings, the circuit layout on the touch panel 200 is merely depicted simplistically in FIG. 7 and FIG. 8, and the transparent cover 600 is omitted in FIG. 8. Referring to FIG. 7 and FIG. 8, in the present embodiment, the touch panel 200 further includes at least one protruding portion 240 protruding from the side L1 and located right above the extending portion 124 of the flexible circuit board 100, and the input element 500 is disposed on the protruding portion 240. In other words, the orthogonal projection areas of the protruding portions 240 respectively overlap with the extending portions 124 of the flexible circuit board 100, and the input elements 500 are respectively disposed on the protruding portions 240. In the present embodiment, the protruding portions 240 protrude from an edge of the touch panel 200 as shown in FIG. 8 and are not collinearly arranged with the bonding regions R1, R2, and R3.

Figure 9:
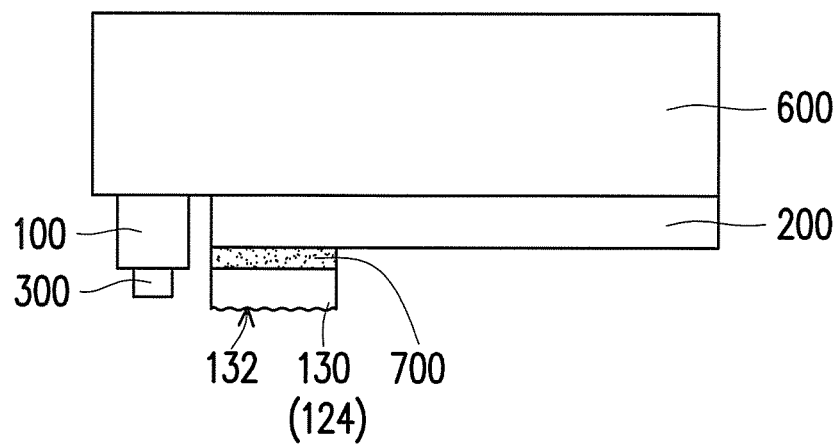
FIG. 9 is a partial schematic cross-section view of the touch panel assembly in FIG. 7 along a line A-A'.
Figure 10:
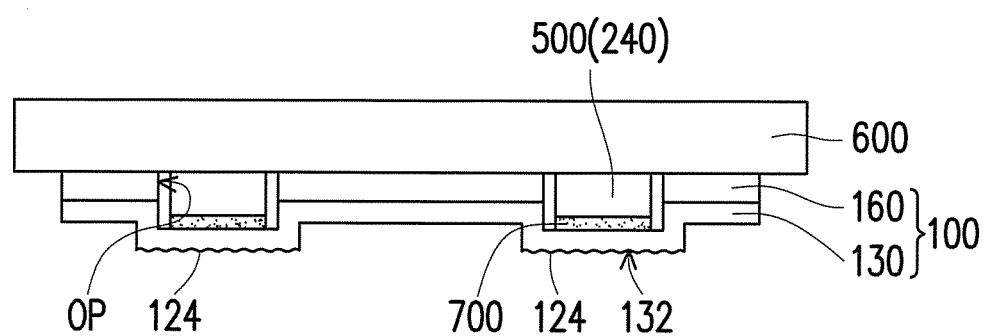
FIG. 10 is a partial schematic cross-section view of the touch panel assembly in FIG. 7 along a line B-B'.

FIG. 9 is a partial schematic cross-section view of the touch panel assembly in FIG. 7 along a line A-A'. FIG. 10 is a partial schematic cross-section view of the touch panel assembly in FIG. 7 along a line B-B'. Referring to FIG. 9 and FIG. 10, in the present embodiment, the touch panel assembly 50 further includes a transparent cover 600 covering the touch panel 200 and the flexible circuit board 100, wherein the light emitting element 300 is disposed at the lower surface of the transparent cover 600. To be more specific, the flexible circuit board 100 further includes a base layer 160 and a light guide film 130 as shown in FIG. 10, wherein the base layer 160 covers the light guide film 130, and the base layer 160 has at least one opening OP corresponding to the extending portion 124, so as to expose the light guide film 130 located at the extending portion 124. As such, the protruding portion 240 configured with the input element 500 may be extended to the top of the extending portion 124 via the opening OP, and the surface of the light guide film 130 further includes a plurality of micro structures 132, such that the light beam entering the light guide film 130 can be diffused or reflected by the micro structures 132 and be emitted from the surface facing the input element 500, so as to illuminate the input element 500.

Under this disposition, the light emitting element 300 may be disposed on the flexible circuit board 100 facing the extending portion 124, and disposed on the transparent cover 600 via the flexible circuit board 100. Therefore, the light emitting element 300 can be disposed at the light incident side of the light guide portion 120 as shown in FIG. 9, and the light beam emitted by the light emitting element 300 may enter the light guide film 130 through the light incident side, and may be emitted from the surface facing the input element 500 via the micro structures 132, so as to illuminate the input element 500 located right above. Moreover, in the present embodiment, the touch panel assembly 50 may further include an adhesive layer 700 disposed between the protruding portion 240 and the extending portion 124 as shown in FIG. 10 to adhere the protruding portion 240 to the extending portion 124.

Figure 11:
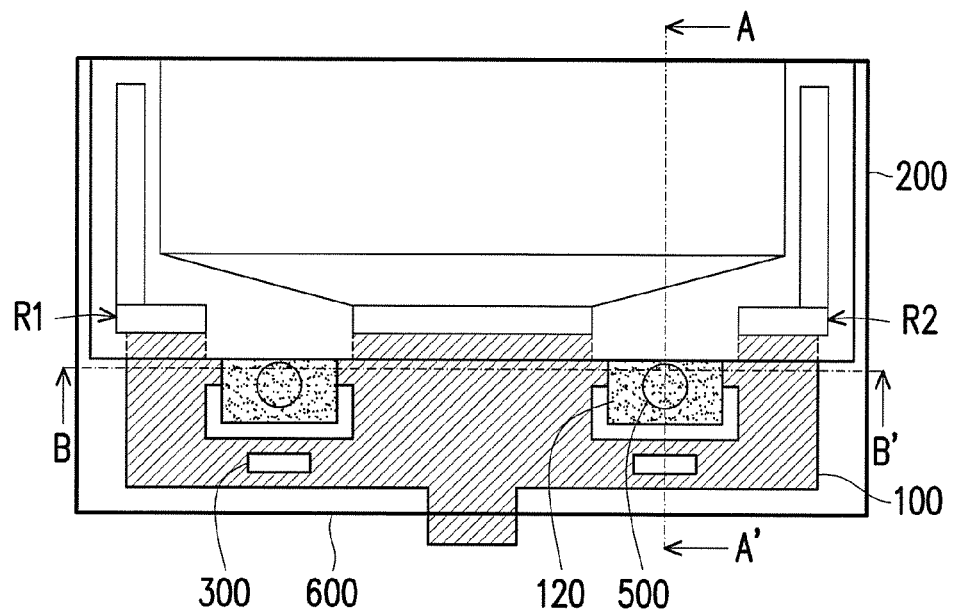
FIG. 11 is a schematic top view of a touch panel assembly according to one embodiment of the invention.

FIG. 11 is a schematic top view of a touch panel assembly according to one embodiment of the application. It should be noted here, the touch panel assembly in the present embodiment is similar to the touch panel assembly in FIG. 5, hence, the present embodiment utilizes the same reference numbers and partial contents of the above embodiment, wherein the same reference numbers are adopted to represent same or similar elements and the description of similar technical content is omitted. Regarding the details of the omitted parts reference to the previous embodiment can be made, and will not be repeated in the present embodiment. The differences between the touch panel assembly in the present embodiment and the touch panel assembly in FIG. 5 are described as follows.

Figure 12:
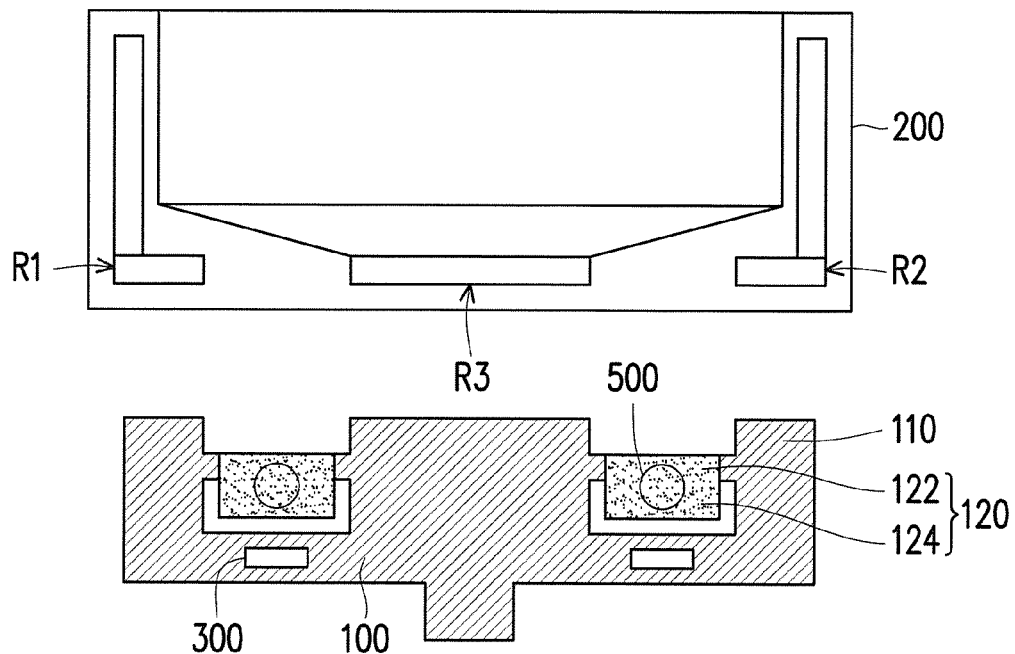
FIG. 12 is an exploded schematic view of some components of the touch panel assembly in FIG. 11.
Figure 13:
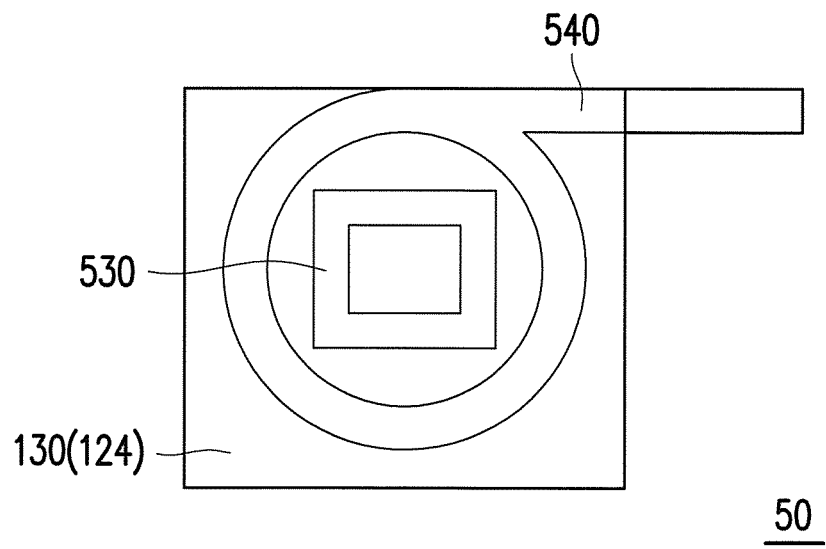
FIG. 13 is a partial enlarged view of the touch panel assembly in FIG. 11.

FIG. 12 is an exploded schematic view of some components of the touch panel assembly in FIG. 11. FIG. 13 is a partial enlarged view of the touch panel assembly in FIG. 11. It should be noted here, for the clarity and simplicity of the drawings, the circuit layout on the touch panel 200 is merely depicted in FIG. 11 and FIG. 12 simplistically, and the transparent cover 600 is omitted in FIG. 12. Referring to FIG. 11 to FIG. 13, in the present embodiment, the input element 500 is disposed on the extending portion 124 of the flexible circuit board 100. To be more specific, the flexible circuit board 100, similar to the previous embodiment, further includes a base layer 160 and a light guide film 130, wherein the base layer 160 covers the light guide film 130, and the base layer 160 has at least one opening OP corresponding to the extending portion 124, so as to expose the light guide film 130 located at the extending portion 124. In the present embodiment, the input element 500 may include a key pattern 530 and a key wiring layer 540. The key pattern 530 may be disposed at the light emitting surface of the light guide film 130, and the key wiring layer 540 may surround the key pattern 530 and is located between the base layer 160 and the light guide film 130. However, the present embodiment is merely for illustration, the structure and the circuit layout of the input element 500 are not limited in the application. In addition, the light guide film 130 may have a plurality of micro structures 132, such that the light beam entering the light guide film 130 may be diffused or reflected by the micro structures 132 and be emitted from the surface facing the input element 500, so as to illuminate the input element 500.

Figure 14:
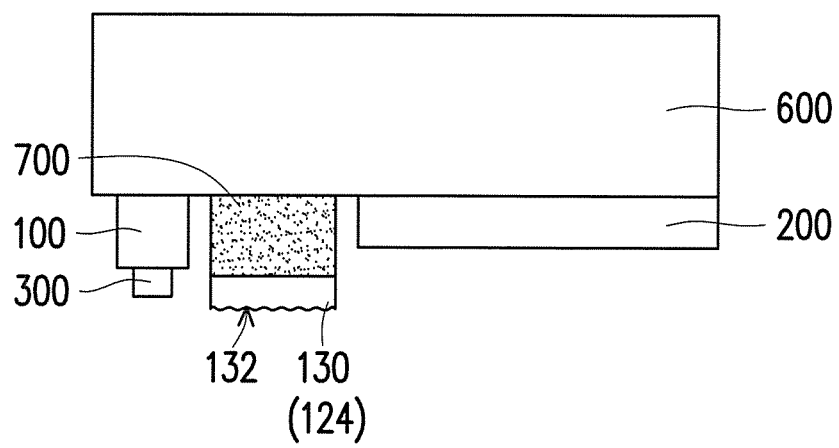
FIG. 14 is a partial schematic cross-section view of the touch panel assembly in FIG. 11 along a line A-A'.
Figure 15:
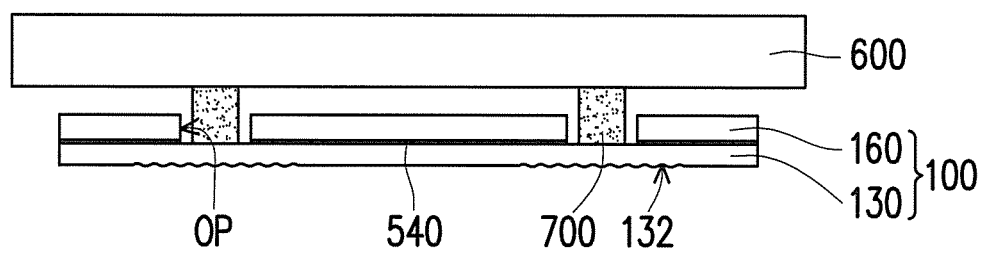
FIG. 15 is a partial schematic cross-section view of the touch panel assembly in FIG. 11 along a line B-B'.

FIG. 14 is a partial schematic cross-section view of the touch panel assembly in FIG. 11 along a line A-A'. FIG. 15 is a partial schematic cross-section view of the touch panel assembly in FIG. 11 along a line B-B'. Referring to FIG. 14 and FIG. 15, in the present embodiment, the touch panel assembly 50 further includes a transparent cover 600 and an adhesive layer 700, wherein the transparent cover 600 covers the touch panel 200 and the flexible circuit board 100, the adhesive layer 700 is disposed between the transparent cover 600 and the extending portion 124. To be more specific, since the base layer 160 of the flexible circuit board 100 has the opening OP corresponding to the extending portion 124 to expose the light guide film 130 below, the adhesive layer 700 may be filled into the opening OP so as to adhere the transparent cover 600 to the extending portion 124. Under this disposition, the light emitting element 300 may be disposed on the surface of the flexible circuit board 100 facing the extending portion 124, and disposed on the transparent cover 600 via the flexible circuit board 100. Therefore, the light emitting element 300 may be disposed at the light incident side of the light guide film 130 as shown in FIG. 14, and the light beam emitted by the light emitting element 300 may enter the light guide film 130 through the light incident side, and be emitted from the surface facing the input element 500 via the micro structures 132, so as to illuminate the input element 500 located right above.

In sum, in the touch panel assembly and the portable electronic device of the application, the flexible circuit board includes a plurality of the bonding portions and at least one light guide portion, the bonding portions are configured to connect to a plurality of pads of the touch panel, and the light guide portion is located between any adjacent two of the bonding portions. In addition, the light guide portion has an extending portion extended in a direction away from the touch panel and located right below the input element. The light emitting element is disposed at a light incident side of the light guide portion, such that the light beam enters the extending portion of the light guide portion and is emitted from the surface of the extending portion facing the input element, so as to illuminate the input element. With this disposition, the touch panel assembly and the portable electronic device using the touch panel assembly of the application may provide the input element with uniform backlight without a need of disposing a light guide plate, so as to efficiently reduce the overall thickness and to further reduce the production cost.

Although the application has been disclosed with reference to the aforesaid embodiments, they are not intended to limit the application. It will be apparent to one of ordinary skill in the art that modifications and variations to the described embodiments may be made without departing from the spirit and the scope of the application. Accordingly, the scope of the application will be defined by the attached claims and not by the above detailed descriptions.

What is claimed is:

1. A touch panel assembly, comprising:
   a touch panel, comprising:
   a plurality of sensing series; and
   a plurality of pads, disposed at a plurality of bonding regions of the touch panel, and electrically connected to the corresponding sensing series respectively, wherein the bonding regions are located at a side of the touch panel;
   a flexible circuit board, comprising:
      a plurality of bonding portions, extended and connected to the bonding regions respectively, wherein each of the bonding portions comprises a plurality of terminals electrically connected to the corresponding pad; and
      at least one light guide portion, comprising a connecting portion and an extending portion, wherein the connecting portion is connected to the corresponding bonding portion, and the extending portion is connected to the connecting portion and extended away from the sensing series of the touch panel;
      a light guide film directly covering an entire top surface of the flexible circuit board;
   at least one input element, located right above the extending portion; and
   at least one light emitting element, disposed at a light incident side of the light guide portion and configured to emit a light beam, wherein the light beam enters the light guide portion and illuminates the input element.

2. The touch panel assembly as claimed in claim 1, wherein the touch panel further comprises a plurality of connecting wires electrically connecting the sensing series and the corresponding pads respectively.

3. The touch panel assembly as claimed in claim 1, wherein a number of the at least one input element is plural, the input elements and the bonding regions are disposed alternately with each other along a direction substantially parallel to the side.

4. The touch panel assembly as claimed in claim 3, wherein a number of the at least one light guide portion is plural, the light guide portions respectively overlap with a plurality of orthogonal projection areas of the input elements where the input elements orthogonally projected.

5. The touch panel assembly as claimed in claim 4, wherein a number of the at least one light emitting element is plural, the extending portions are respectively located on light transmitting paths of a plurality of light beams emitted by the light emitting elements.

6. The touch panel assembly as claimed in claim 1, wherein the flexible circuit board further comprises at least one slot, and the slot surrounds the extending portion to define the light guide portion.

7. The touch panel assembly as claimed in claim 1, wherein the bonding regions are located at a lower surface of the touch panel, the flexible circuit board is disposed at the lower surface and connected to the bonding regions.

8. The touch panel assembly as claimed in claim 1, further comprising a transparent cover covering the touch panel and the flexible circuit board, wherein the light emitting element is disposed at a lower surface of the transparent cover.

9. The touch panel assembly as claimed in claim 1, further comprising a substrate, wherein the light emitting element is disposed on the substrate and located between the touch panel and the substrate.

10. The touch panel assembly as claimed in claim 1, wherein the flexible circuit board further comprises a light guide film at least covering an upper surface of the light guide portion.

11. The touch panel assembly as claimed in claim 10, wherein the light guide film has a plurality of micro structures.

12. The touch panel assembly as claimed in claim 1, wherein the flexible circuit board further comprises a base layer and a light guide film, the base layer covers the light guide film and has at least one opening corresponding to the extending portion so as to expose the light guide film located at the extending portion.

13. The touch panel assembly as claimed in claim 12, wherein the light guide film has a plurality of micro structures.

14. The touch panel assembly as claimed in claim 1, wherein the input element is disposed at the side and located between any adjacent two of the bonding regions.

15. The touch panel assembly as claimed in claim 1, wherein the touch panel further comprises at least one protruding portion protruding from the side and located right above the extending portion, and the input element is disposed on the protruding portion.

16. The touch panel assembly as claimed in claim 15, further comprising an adhesive layer disposed between the protruding portion and the extending portion to adhere the protruding portion to the extending portion.

17. The touch panel assembly as claimed in claim 1, wherein the input element is disposed on the extending portion.

18. The touch panel assembly as claimed in claim 17, further comprising a transparent cover and an adhesive layer, wherein the transparent cover covers the touch panel and the flexible circuit board, and the adhesive layer is disposed between the transparent cover and the extending portion.

19. A portable electronic device, comprising:
   a case, having an opening;
   a display module, disposed in the case, wherein the opening exposes a display surface of the display module; and a touch panel assembly as claimed in claim 1, wherein the touch panel is disposed on the display surface.

\* \* \* \* \*